Aug. 31, 1965      K. F. FRANK      3,203,233
SELF-CENTERING MEANS FOR ROTATING SHAFT
Filed Feb. 6, 1963      3 Sheets-Sheet 2
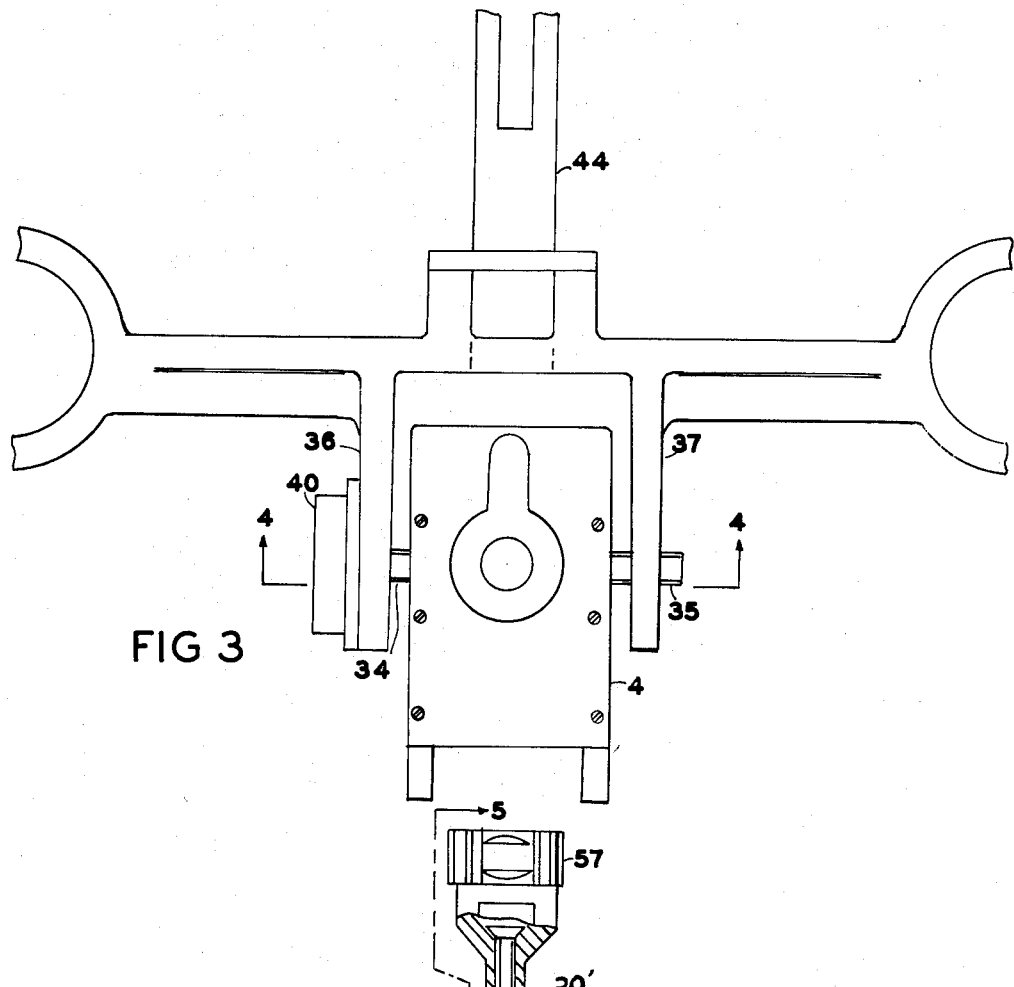
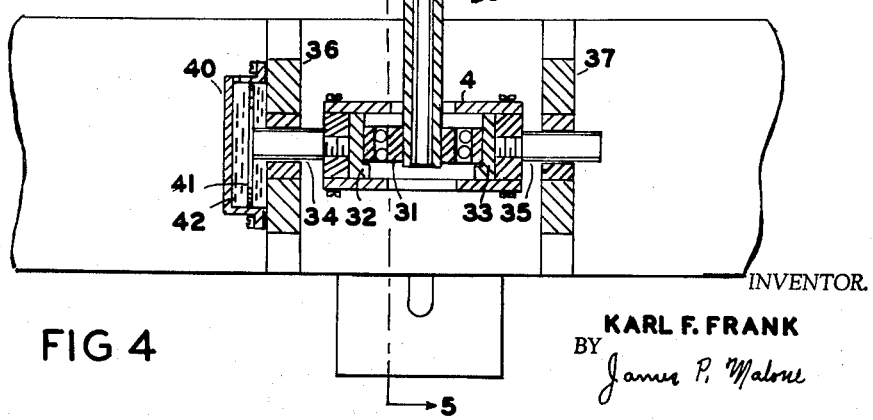
INVENTOR.
KARL F. FRANK
BY James P. Malone

United States Patent Office 3,203,233
Patented Aug. 31, 1965

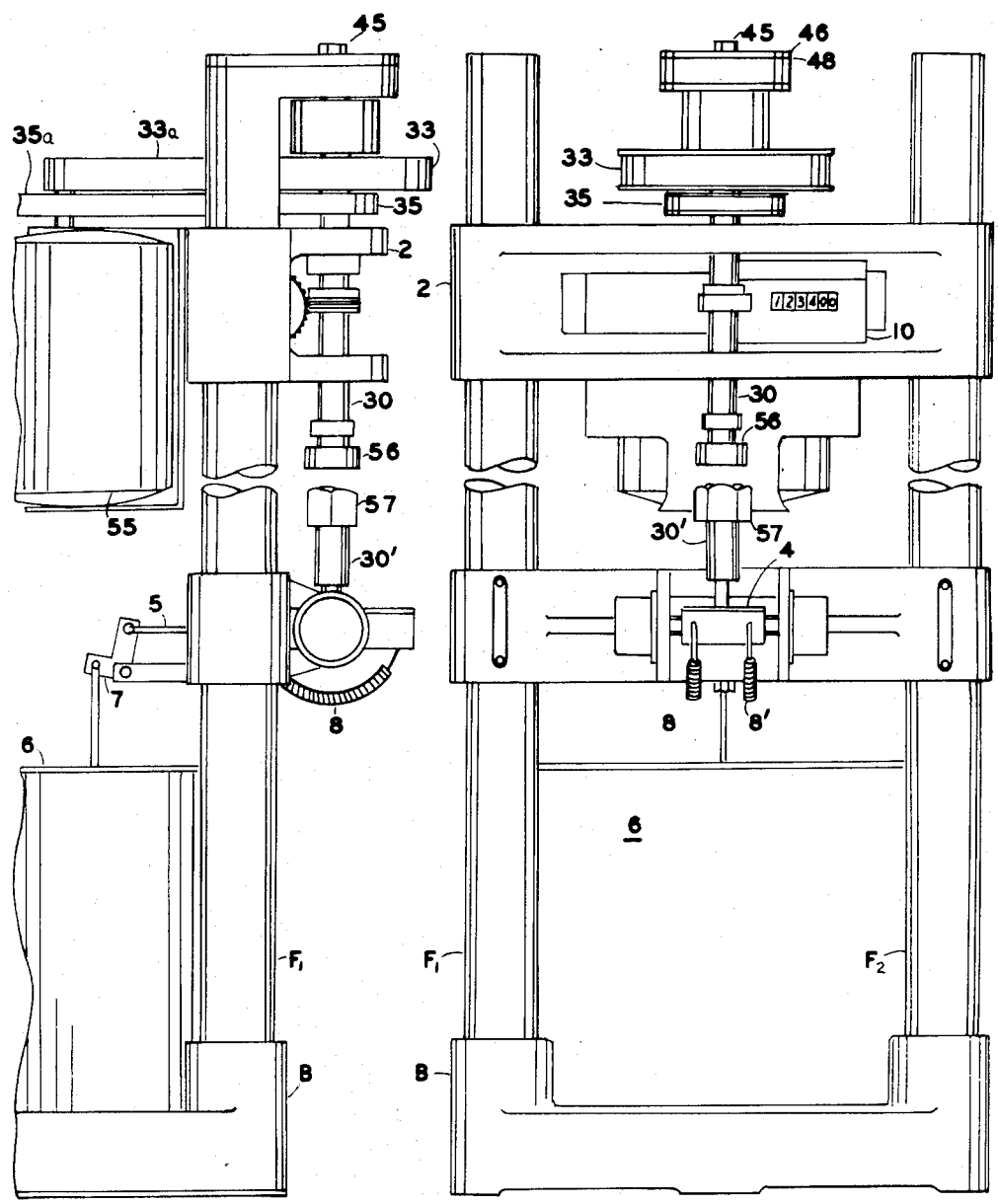

3,203,233
SELF-CENTERING MEANS FOR ROTATING SHAFT

Karl F. Frank, Garden City, N.Y., assignor to Micro-Balancing, Incorporated, Garden City Park, N.Y.
Filed Feb. 6, 1963, Ser. No. 256,753
5 Claims. (Cl. 73—100)

This invention relates to self-centering means for a rotating shaft and more particularly to means for restraining movement of one end of said shaft to one direction when a bending force is applied in that direction, only.

The invention is illustrated in a rotary shaft bending and fatigue testing machine where it is desired to apply measured bending forces to one end of the test specimen in a programmed manner while the specimen is rotating at a predetermined speed. It is desired to apply the bending movement to the test specimen in one direction and to restrain movement of the test specimen to said direction and eliminate vibrations and stresses in other directions caused by misalignment. The force is applied in one angular direction and the test rod bends in that direction in one sense while bending, and in the reverse sense while unbending.

The purpose of the testing machine is the performance of high speed rotating beam bending fatigue tests under constant amplitude as well as programmed variable amplitude loading. Loads are applied using a combination of load springs and an electro-magnetic force generator acting through a mechanical force multiplier. Maximum versatility of load programs is provided by a constant amplitude, spring applied base load and discrete superimposed infinitely variable load levels. The variable preset base load is always present while the surcharge loads may be applied through a punched traveling tape type programmer in any desired sequence such as stepwise increasing, stepwise decreasing, or random. The number of cycles of application of each load level is variable from a minimum of five cycles upward, with the aid of a dual speed driving mechanism and an accurate counter. Infrequent high load levels are applied at a low speed of 600 r.p.m. The speed change which is accomplished by a fast operating magnetic clutch, which is programmed together with the locating and damping means of the present invention.

The fatigue testing machine applies accelerated typical stress patterns to rotating testing pieces. The test piece may for instance be a bolt used in a vehicle or aircraft. In order to test the pieces properly it is desired to apply high and low speed programmed stress loads which have been developed from machines in service tests with a driven vehicle or aircraft.

It is desired to test the material specimen by applying a bending force at the end of the rotating specimen in one direction only and it is therefore necessary to constrain the end of the specimen in a direction perpendicular to the applied force. Any misalignment of the specimen bearing holder would apply a bending force in a direction other than the applied force and the theory of calculation based thereon would have no significance.

A bending moment is applied to the rotating cantilever specimen through an extension arm attached to its free end. The extension arm is held in the novel centering mechanism of the present invention which eliminates all bending moments in directions perpendicular to the applied load through viscous damping.

This mechanism consists of a heavy duty self-centering bearing loaded by an oil dash pot which provides sufficient damping at the specific frequencies of the machine (6000 and 600 r.p.m.) to effectively reduce and substantially eliminate vibrations and movements in a direction perpendicular to the applied load. The whole assembly is precision mounted on two vertical column supports which facilitate the positioning of the spindle so that specimens of various length as well as diameter may be tested.

Accordingly, a principal object of the invention is to provide new and improved self-centering means for a rotating shaft.

Another object of the invention is to provide new and improved means to restrain one end of a rotating shaft within a single direction.

Another object of the invention is to provide new and improved means to restrain one end of a rotating shaft to movement in one plane.

Another object of the invention is to provide new and improved means for locating one end of a rotating shaft comprising a heavy duty self-centering bearing supported by an oil dash pot for effectively reducing the vibrations in any direction other than the direction of applied force.

Another object of the invention is to provide new and improved damping means in a testing machine which applies a force to a rotating specimen in a first direction, to substantially eliminate vibrations outside of said direction.

Another object of the invention is to provide new and improved material testing means.

These and other objects of the invention will be apparent from the following specification and drawings of which:

FIGURE 1 is a side view of a machine incorporating the invention.

FIGURE 2 is a front view of FIGURE 1.

FIGURE 3 is a partial top view of the embodiment of the invention.

FIGURE 4 is a sectional view taken along the lines 4—4 of FIGURE 3.

Figure 5:
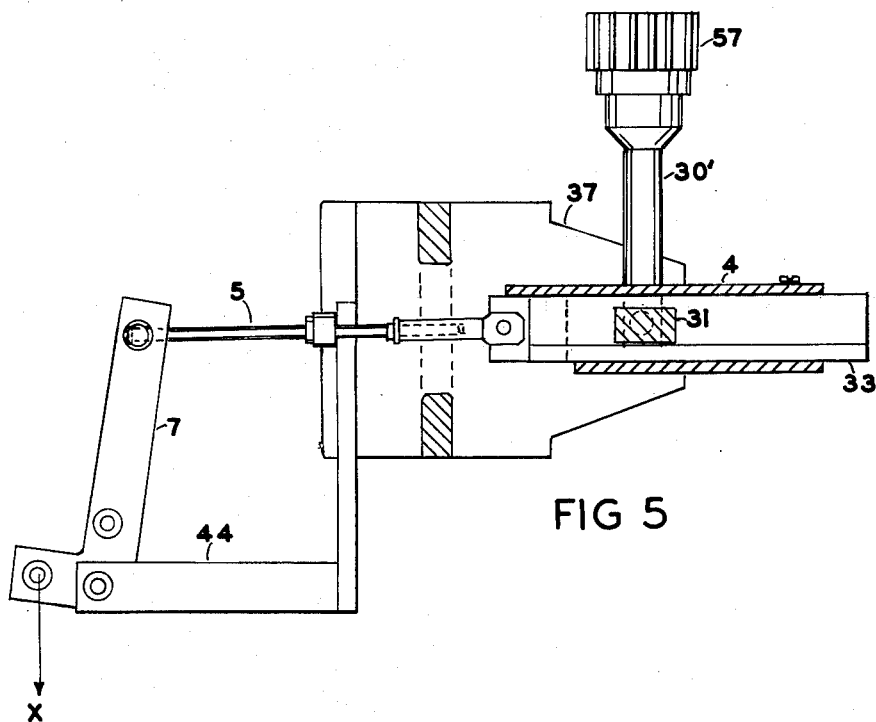
FIGURE 5 is a sectional view taken along the lines 5—5 of FIGURE 4.

FIGURES 1 and 2 show front and side views of testing apparatus which incorporates the present invention. The testing apparatus includes a base B and a pair of frame columns F1 and F2. The test pieces are adapted to be mounted on shafts 30 and 30'. The shaft 30 is adapted to be driven by the motor 55 through high and low speed pulley systems 33, 33a, and 35, 35a etc. Magnetic clutch means 45, 46, and 48, are adapted to connect the motor to the driven shaft 30 through either the high or low speed pulley system. The shaft 30 is rotatably mounted in bracket 2 which is mounted on the frame columns F1 and F2. The testing device may also have counter 10 geared to the shaft 30 for the purpose of counting the test cycles.

The lower chuck 57 is mounted on a shaft 30' which is mounted on pivoted hollow member 4. Member 4 is constructed so that a horizontal force in one plane may be applied to the lower chuck member 57 by means of the rod or cable 5 which is connected to an electro-magnetic random load generator 6 by means of the pivoted member 7 which is mounted in frame bracket 1. The bracket 4 may have a constant preset load provided by the constant load springs 8 and 8'.

Referring more specifically to the invention, FIGURES 3, 4, and 5, are details of the centering and locating means of the present invention. The test specimen is mounted in the chuck 57 which is mounted on the shaft 30'. The shaft 30' is mounted in a bearing 31 which is fixedly mounted in guides 32 and 33 which are slidably mounted in a hollow member 4. The hollow member 4 is pivotally mounted to the frame brackets 36 and 37, by means of the co-axial mounting shafts 34 and 35 which extend through bearings of the bracket arms 36 and 37. The shaft 34 terminates in a dash pot 40, the arm 34 being connected to the piston member 41 which is in the dash pot chamber 40 which is filled with oil or with other viscous fluid 42.

Referring also to FIGURE 5, bearing 31 is fixedly mounted to sliding members 32 and 33 which slide in the hollow member 4. The rod 5 which is connected to the sliding members 32 and 33, is adapted to move them as required. Arm 5 is connected to one end of crank arm 7 which is pivotally mounted on the bracket 44. Therefore, a force X is applied to the other end of the crank arm 7, will rotate it counter-clockwise, pulling the rod 5 and the lower end of shaft 30' to the left in FIGURE 5.

This motion must be constrained to the direction of motion. If it is not, then various vibrations and errors would affect the testing and the calculations for measuring the strength of the specimen. In order to constrain the end of the shaft within the direction of the applied motion, the dash pot centers and locates the lower end of the shaft in the direction of the applied force and substantially eliminates the vibrations and movement outside of that direction. The size of the dash pot and piston and the viscosity of the fluid therein are chosen to be in proportion to the forces applied in a desired application.

The rotating shaft cannot be rigidly constrained to the direction of motion since to do so, in the event of any misalignment, would set up unmeasurable stresses, strains, and vibrations in the test piece, which would upset the calculations based on the test and would effectively limit the value of the test.

I claim:

1. Means to maintain one end of a rotating shaft in one plane as said end is moved in said plane comprising:
   a frame having two parallel projecting arms,
   a hollow member, means to pivotally mount said hollow member between said arms, comprising,
   a pair of co-axial shafts connected to said hollow member and slidably mounted in and between said arms perpendicular to said plane,
   a bearing slidably mounted in said hollow member, for movement in said plane transverse to the axis of said co-axial shafts,
   said rotating shaft being mounted in said bearing so that said shaft may move in said plane perpendicular to said mounting shafts,
   and dash pot means mounted on said projecting arms and connected to one of said mounting shafts.

2. Means to maintain one end of a rotating shaft in one plane as said end is moved in said plane comprising,
   a frame,
   a hollow member, means to pivotally mount said hollow member on said frame comprising,
   a pair of co-axial shafts connected to said hollow member and slidably mounted to said frame for movement perpendicular to said plane,
   a bearing slidably mounted in said hollow member, for movement in said plane transverse to the axis of said co-axial shafts,
   said rotating shaft being mounted in said bearing so that said shaft may move in said plane perpendicular to said mounting shafts,
   and means mounted in said frame and connected to one of said mounting shafts to constrain said bearing to movement in said plane.

3. Apparatus as in claim 2 wherein said last means is a dash pot.

4. Means to maintain one end of a rotating shaft in one plane and minimize vibrations as said end is moved in said plane comprising,
   a frame having two parallel projecting arms,
   a hollow member, means to pivotally mount said hollow member between said arms comprising,
   a pair of co-axial shafts connected to said hollow member and slidably mounted in and between said arms perpendicular to said plane,
   a bearing slidably mounted in said hollow member, for movement in said plane transverse to the axis of said co-axial shafts,
   said rotating shaft being mounted in said bearing so that said shaft may move in said plane perpendicular to said mounting shafts,
   and dash pot means mounted on said projecting arms and connected to one of said mounting shafts.

5. Means to maintain alignment of a rotation shaft in one plane as one end is moved in said plane comprising,
   a frame,
   a hollow member, means to pivotally mount said hollow member on said frame comprising,
   a pair of co-axial shafts connected to said hollow member and slidably mounted in and between said arms perpendicular to said plane,
   a bearing slidably mounted in said hollow member, for movement in said plane transverse to the axis of said co-axial shafts,
   said rotating shaft being mounted in said bearing so that said shaft may move in said plane perpendicular to said mounting shafts,
   and dash pot means mounted on said frame and connected to one of said mounting shafts.

References Cited by the Examiner

UNITED STATES PATENTS 3,015,523   1/62   Semar _____ 308—9

RICHARD C. QUEISSER, *Primary Examiner.*

JOSEPH P. STRIZAK, *Examiner.*